Sept. 11, 1962     R. H. HARPER     3,053,572
TRAILER DUMPING HITCH

Filed June 24, 1960

INVENTOR.
*Rufus H. Harper*
BY
*Frease, Bishop, Johns & Schick*
ATTORNEYS

United States Patent Office 3,053,572
Patented Sept. 11, 1962

3,053,572
TRAILER DUMPING HITCH
Rufus H. Harper, 9060 Beatty St. NE., Massillon, Ohio
Filed June 24, 1960, Ser. No. 38,529
1 Claim. (Cl. 298—5)

This invention relates to a trailer dumping hitch and more particularly it pertains to a trailer hitch for automatically dumping a trailer of the type that is preferably attached to an automobile.

Trailer hitches of various types have been known and used in the past. Although most of the hitches have not included means for dumping the trailer, some hitches have been provided with dumping mechanisms of one kind or another. Indeed, a few hitches have been proposed for automatically dumping but have been unsatisfactory for several reasons, including costly, complicated and bulky structures.

Accordingly, it is a general object of this invention to provide a dumping hitch for a trailer which operates automatically in response to manipulation of the automobile to which the trailer is attached.

It is another object of this invention to provide a trailer hitch which dumps automatically in response to a particular sequence of operations of the automobile to which the trailer is attached.

It is another object of this invention to provide an automatic dumping trailer hitch which is positive in operation and which is uncomplicated in construction.

Generally the improved trailer dumping hitch construction of the present invention may be stated as including in a trailer having a trailer bed with front and rear ends and having a pair of swivelly mounted wheels on the undersurface of the bed in which the wheel is normally behind the swivel mounting when the trailer is moving forward and is ahead of the mounting when the trailer is moving backwards, the combination of a pair of hitch connectors extending forwardly from the front end of the trailer to a bumper of an automobile, each connector being composed of a first and second portion with the first portion attached to the trailer and the second portion being pivotally attached to a bumper of an automobile, means interconnecting the first and second portions including a horizontal pivot pin in one of the portions and a pin-receiving elongated slot in the other portion, the portion including the pivot pin having flange means for engaging the other portion during forward motion of the trailer when the pivot pin is located at one end of the slot, whereby reversal of direction of travel of the trailer causes the wheels to move to a position ahead of their swivel mounting on the trailer and the pivot pin moves simultaneously to the other end of the slot to permit the contents of the trailer to lower the rear end of the trailer about the wheels.

In the drawings, in which a preferred embodiment of the invention is shown by way of example:

Similar numerals refer to similar parts throughout the drawings.

Figure 2:
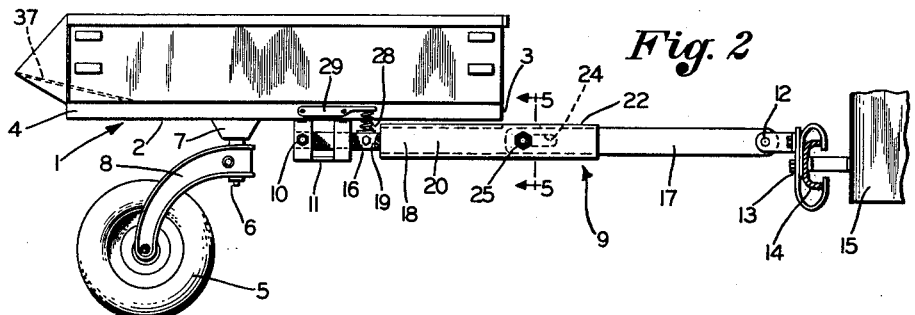
FIG. 2 is an elevation view of the trailer connected to a rear bumper of an automobile and showing the position of the wheels when the trailer is traveling in the forward direction.

In the drawings, a trailer is generally indicated at 1 and it includes a trailer bed 2 having front and rear ends 3 and 4 and having a pair of similar wheels 5 which are swivelly mounted on a vertical pinion 6 in a base 7 on the undersurface of the bed 2. Each wheel 5 is mounted in an arcuate wheel fork 8 in a conventional manner.

Figure 1:
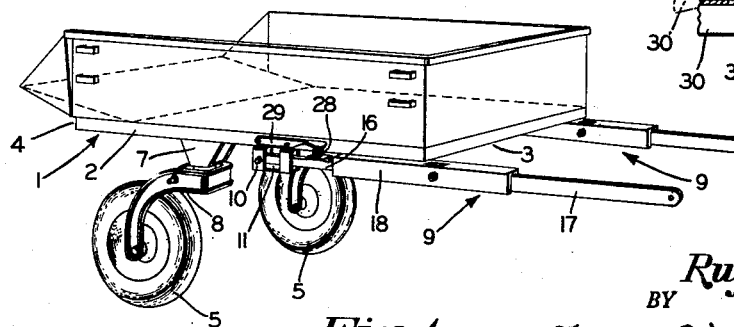
FIGURE 1 is a perspective view of a trailer having a pair of swivelly mounted wheels and a pair of hitch connectors extending forwardly from the trailer.

As shown in FIGS. 1 and 2, the trailer 1 is also provided with a pair of similar hitches 9, the rear ends of which are separately mounted by pivot bolts 10 on brackets 11 on the bed 2. The forward end of the hitch 9 is pivotally secured at 12 to a clamp 13 which is secured to a bumper 14 of an automobile 15.

Figure 5:
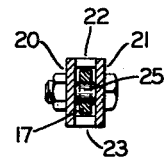
FIG. 5 is a vertical sectional view taken on the line 5—5 of FIG. 2.

Each hitch 9 includes a connector 16 and a connecting link 17. The connector 16 includes a channel arm or member 18 which is secured to the end of the connector by a weld 19. The member 18 is preferably a rectangular tubular member having opposite side walls 20 and 21 as well as upper and lower flanges 22 and 23, respectively, as shown in FIG. 5.

The left end portion of the connecting link 17, as viewed in FIG. 2, extends into the open end of the member 18 where it is slidably disposed. The link 17 is provided with an elongated slot 24 and a pivot pin 25, extending through and between opposite side walls 20 and 21, also extends through the slot 24. In addition, the upper flange 22 of the member 18 is preferably provided with an opening 26 and the lower flange 23, being shorter than the upper flange 22, provides a slotted opening 27 below a greater portion of the end portion of the link 17 which extends into the member 18.

In operation, during forward travel of the trailer 1 with the vehicle or automobile 15, the several parts of the hitch are disposed in the positions shown in FIG. 2, whereby the pivot pin 25 is disposed at the left or rear end of the slot 24 because of the pulling force applied by the automobile 15 on the link 17. At the same time the forward weight of the trailer is borne by the upper flange 22 resting upon the upper edge of the link 17.

As shown in FIG. 2, a tension spring 28 is provided between the connector 16 and a spring bracket 29 which is secured to the bed 2 of the trailer 1. During forward travel of the trailer 1 the center of gravity of the assembly is disposed ahead of the center of the wheels 5.

Figure 3:
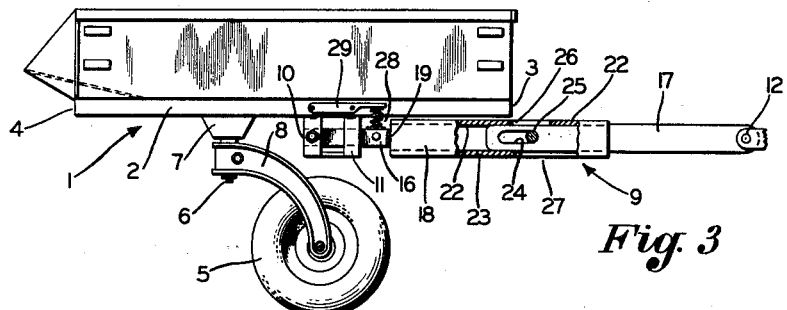
FIG. 3 is an elevation view of the trailer, partly in section and showing the position of the wheels when the trailer is traveling backwards.

When it is necessary to reverse the direction of travel of the trailer 1, the operator simply reverses direction of the vehicle 15, whereupon the link 17 moves leftward with respect to the member 18 so that the pivot pin 25 moves to the opposite end of the slot 24, as shown in FIG. 3. Further reverse travel of the trailer 1 causes the wheels 5 to turn 180° around their pivot mounting 6 to the position shown in FIG. 3. In such position the center of gravity of the trailer is to the left of the center of the wheels 5 as shown in FIG. 3.

To prevent the trailer 1 from dumping, a portion of the link 17 is disposed securely between upper and lower flanges 22 and 23 so that the members 17 and 18 cannot turn around the pivot pin 25 due to forces caused by the weight of the trailer which may or may not be loaded. So long as the parts 17 and 18 are retained in the positions shown in FIG. 3, the trailer will not dump.

Figure 4:
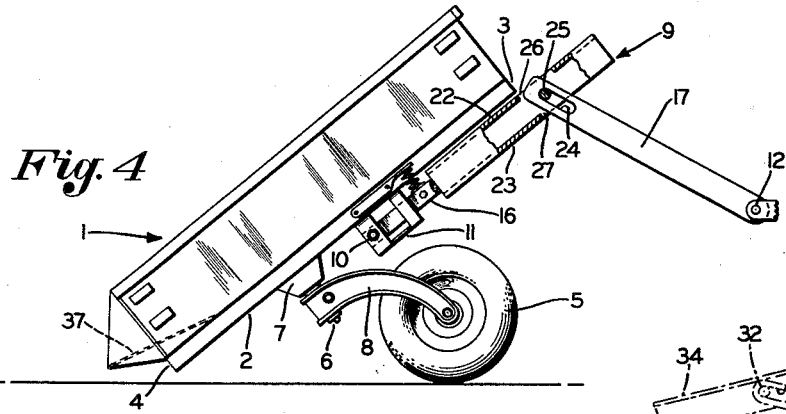
FIG. 4 is an elevation view, partly in section, showing the relationship between the parts of the hitch connectors when the trailer is in the dumping position.

Thereafter, if the operator of the vehicle 15 wishes to dump the trailer, it is necessary to reverse the direction of travel of the vehicle and simply start forward a sufficient distance to move the link 17 a distance equal to the length of the slot 24 so that the pin 25 is again disposed at the left end of the slot 24. In that position the left end portion of the link moves out of engagement between the flanges 22 and 23 and the link 17 and member 18 are free to turn with respect to each other about the pin 25 to the dumping position of FIG. 4.

It is emphasized, however, that the dumping position can be achieved only if the reversal of direction of travel of the automobile 15 occurs relatively slowly enough to permit the link 17 to move through a distance equal to the length of the slot 24. Further forward movement of the vehicle would immediately cause the trailer to move forward and the wheels to turn 180° again to the position of FIG. 2, whereupon no dumping action would occur.

Figure 6:
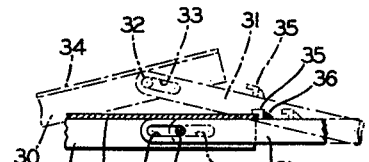
FIG. 6 is a vertical sectional view of an alternative construction of the hitch connectors showing the positions of the parts in the various positions in solid and broken line for three sequences of movement.

Another embodiment of the invention is shown in FIG. 6 in which an angle member 30 is connected to a link 31 by a pivot pin 32 which extends through a slot 33 in the link. The angle member 30 differs from the member 18 in that the former includes only an upper flange 34 which is coextensive with the length of the member 30. The member 30 is not provided with a lower flange similar to the lower flange 23 of the member 18. However, the link 31 differs from the link 17 in that the former is provided with a flange-engaging hook 35 which is welded at 36 on the upper side of the link 31.

During forward movement of the trailer the hitch shown in FIG. 6 is disposed in a manner similar to that of the first embodiment as shown in FIG. 2, that is, the pin 32 is disposed at the left end of the slot 33 so that the weight of the trailer is borne by the flange 34 resting upon the upper side of the link 31. When the vehicle is reversed, the pin 25 moves to the right end of the slot 33 and the hook 35 engages the right end of the flange 34 to prevent the trailer from dumping due to similar conditions existing as described with regard to FIG. 3. Thereafter, when the operator moves the vehicle 15 forward, the pin 32 moves to the left end of the slot 33 so that the member 30 is free to turn out of alignment with the member 31 about the pin 32.

As shown in the drawings, an upwardly inclined bed plate 37 is provided in preference to a tailgate so that material loaded in the trailer, such as gravel, sand or soil, will not roll out during forward travel of the trailer but will provide a surface over which the material will fall when the trailer is dumped.

Accordingly, the present invention provides an improved dumping hitch for automobile trailers which eliminates prior art difficulties, solves problems which have existed in the art and obtains the described new results not obtained by prior art structures. The improved trailer hitch provides a completely automatic mechanism for dumping a trailer and thereby permits the operator of the vehicle to remain in the vehicle and in its control without having to leave the vehicle in order to attend to the trailer, such as by manipulating a part to cause the trailer to dump as in prior constructions.

In the foregoing description, certain terms have been used for brevity, clearness and undestanding; but no unnecessary limitations are to be implied therefrom beyond the requirements of the prior art, because such terms are utilized for descriptive purposes herein and not for the purpose of limitation and are intended to be broadly construed.

Moreover, the description of the improvements is by way of example and the scope of the present invention is not limited to the exact details illustrated, or to the specific mechanisms shown.

Having now described the features, discoveries and principles of the invention, the construction, operation and use of the improved mechanisms and the advantageous, new and useful results obtained thereby; the new and useful parts, elements, constructions, mechanisms, combinations, subcombinations, and arrangements, and mechanical equivalents obvious to those skilled in the art, are set forth in the appended claim.

What is claimed is:

In a dumping trailer of the type having a trailer bed with front and rear end portions, having at least one wheel swivelly mounted on the undersurface of the trailer bed, and wherein the wheel is behind or ahead of the swivel mounting when the trailer is moving forward or backward respectively, and wherein the axle of the wheel is the pivot about which the trailer bed turns between upright and dumping positions; the combination therewith of (a) a pair of laterally spaced hitch connectors extending from the front end of the trailer to a pair of laterally spaced pivot connections on an automobile bumper, (b) each hitch connector including an arm and a link, (c) one end of the link being pivotally connected to one of said pivot connections, (d) the arm being a channel member having a vertical web and upper and lower horizontal flanges and having one end portion attached to the underside of the trailer bed, (e) a pivot pin on the arm near the other end thereof and extending from the same side of the web as the flanges, (f) the link having a longitudinal pivot-pin-receiving slot at the other end thereof, (g) the pivot pin and the slot forming a pivotal connection between the arm and link which are rotatable between aligned and unaligned positions corresponding respectively to upright and dumping positions of the trailer, (h) the upper flange resting upon the upper edge of the link and the pivot pin being located at the end of the slot near said other end of the link when the trailer is upright and being towed forward, (i) the lower flange terminating at a location near the pivot pin and on the side of the pin adjacent the trailer, (j) the pivot pin being located at the opposite end of the slot and said one end of the link being snugly engaged between the upper and lower flanges when the trailer is upright and being towed rearward, (k) and the upper flange having opening means above the pivot pin for receiving said other end portion of the link when the arm and link are in the unaligned position corresponding to the trailer dumping position, whereby the trailer automatically assumes the dumping position about the axis of the wheel.

References Cited in the file of this patent

UNITED STATES PATENTS

| 2,179,586 | Carpenter | Nov. 14, 1939 |
| 2,256,038 | Woodruff | Sept. 16, 1941 |
| 2,628,733 | Hale | Feb. 17, 1953 |
| 2,823,817 | Holschlaw | Feb. 18, 1958 |

FOREIGN PATENTS

| 25,511 | Finland | June 26, 1952 |
| 523,267 | France | Aug. 16, 1921 |
| 811,517 | France | Apr. 16, 1937 |